Sept. 15, 1959     E. T. ELFGREN     2,904,007
ANIMAL OILER
Filed Feb. 14, 1958
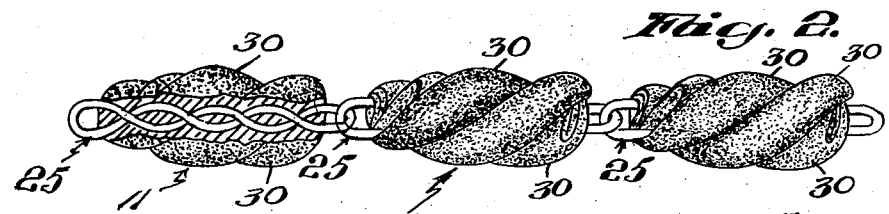
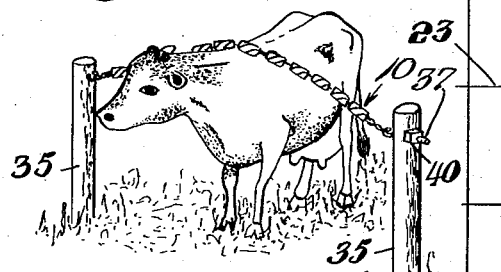
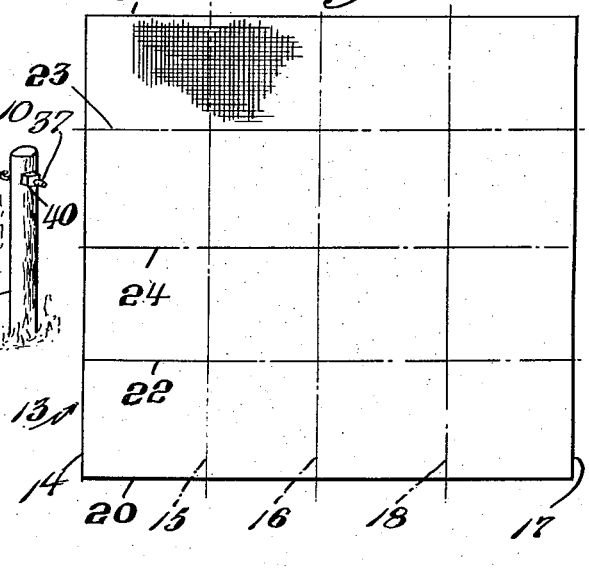
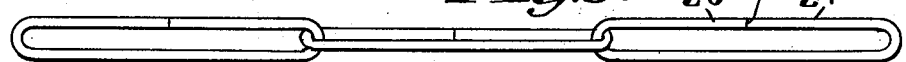
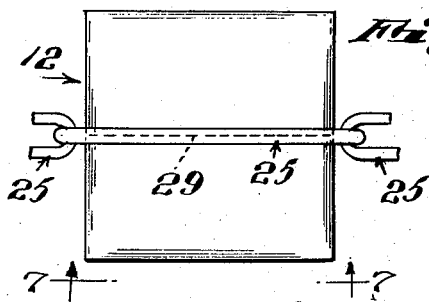
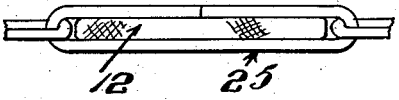
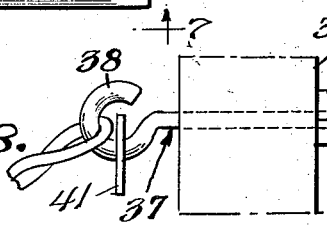
INVENTOR.
Ernest T. Elfgren
BY
Barlow & Barlow
ATTORNEYS.

United States Patent Office 2,904,007
Patented Sept. 15, 1959

2,904,007
ANIMAL OILER
Ernest T. Elfgren, Berwyn, Nebr., assignor to Elfco, Inc., a corporation of Nebraska
Application February 14, 1958, Serial No. 715,233
2 Claims. (Cl. 119—157)

This invention relates to improvements in a medicated oiler and insecticide applicator which cattle, hogs, sheep and other animals rub against to scratch themselves and are at the same time medicated with oil or an insecticide.

An object of the invention is the provision of a ruggedly constructed medicated oil and insecticide applicator units connected together into a chain form.

Another object of the invention is the provision of an applicator of the above type in which each of the units will be resiliently compressible under the rubbing action of animals thereagainst for expelling the medication or insecticide contents thereof on the cattle.

A more specific object of the invention is the provision of an applicator of the above type in which an absorbent material pad will be held twisted in a helical form on a link chain.

With these and other objects in view, the invention consists of certain novel features of construction, which will be more fully described and particularly pointed out in the appended claims.

In the accompanying drawing:

Figure 1 is a pictorial view of an animal oiler and insecticide applicator embodying the invention and illustrating one manner of use thereof;

Figure 2 is an elevational view of three connected units of the applicator of Figure 1 with the pad of one unit shown broken away;

Figure 3 is an elevational view of a portion of a link chain employed in making the applicator;

Figure 4 is a plan view of a woven cloth pad;

Figure 5 is a plan view of a sheet of woven cloth prior to folding the same into the pad of Figure 4;

Figure 6 is a view illustrating the pad of Figure 4 inserted into one of the links of Figure 3;

Figure 7 is an edge view of Figure 6 looking thereat in the direction of the arrows on line 7—7 of Figure 6; and Figure 8 is a sectional view of one of the anchor means for the applicator of Figure 1.

Referring to the drawing in more detail, 10 designates an animal oiler and insecticide applicator which comprises a plurality of separate units designated generally 11 which are flexibly connected to each other. Each unit 11 is similar and therefore only one will be described. The unit 11 comprises a pad 12, Figure 4, of any suitable absorbent material, as for example, a woven burlap. Preferably, the pad 12, in the present instance, is formed from a square piece of burlap 13, Figure 5, which is folded at the four edges to the center. That is, the edge 14 of the square may be first folded along line 15 and the edge 14 positioned on the center line 16 extending in one direction of the square, the line 15 being parallel to and at an equal distance between edge 14 and center line 16. The opposite edge 17 of the square is similarly folded along line 18 which is likewise parallel to and at an equal distance between center line 16 and edge 17. Thus, the square is folded in half in one direction with the edges 14 and 17 adjacent each other at the center of the square 13 which provides a double thickness of burlap. The other edges 20, 21 of the square are likewise folded along lines 22, 23 which are at right angles to the first folds but otherwise similarly related to the center line 24 in the other direction of the square 13. It will be apparent from the above that the fully folded pad is made of four thicknesses of burlap with the edges of the initial piece of burlap meeting at the center. Thus, the edges of the burlap piece are protected against raveling.

The core of each unit comprises an elongated metal link 25 which may be conveniently formed of wire folded into an elongated closed loop with the ends 26, 27 meeting at substantially the middle of the link at as 28 and there welded to each other. The links 25 are connected to each other to form a link chain of a required length. It will, of course, be understood that links are first coupled to each other and then the said ends 26, 27 welded. A pad 12 is inserted through each link as seen in Figures 6 and 7, with the meeting edges 29 of the last folds extending parallel to the longitudinal extent of the link and in line with the adjacent side of the link. The link 25 with the pad inserted therethrough is next twisted three or four complete turns which will twist the pad 12 into a cylinder or roll as seen in Figure 2, having an outer helically ribbed periphery as at 30. Thus, a flexible chain is formed in which each link includes a helical roll made of a resilient compressible and absorbent material which is firmly held to the metal core against separation therefrom.

There is shown in Figure 1, as by way of example, one way of employing the applicator 10. This comprises stringing the applicator between spaced posts 35 so as to hang somewhat loosely therebetween. The ends of the chain may be secured to the upper end of each post, or alternately to the upper end of one post and the lower end of the other by means of a bolt 37, see Figure 8, which terminates at one end thereof into a hook 38 and is screw threaded at the other end portion as at 39, the bolt extending through the post and secured thereto by a nut 40. A washer 41 is inserted on the hook 38 to hang loosely therefrom. The chain is inserted on the hook 38 as shown and is prevented from being dislodged therefrom by the washer 41. To unhook the chain the washer is held parallel to the underside of the chain away from the opening of the hook and the chain may be easily slipped off. In practice the posts 35 are spaced approximately 10 feet apart and the hooks, as shown, are positioned 4 feet high. The chain is made of a length to hang about 2 feet from the ground at the center of the chain and if a diagonal attitude is desired, an appropriate minimal sag will be secured.

The chain is first soaked in the desired medication fluid, powder, oil or insecticide, as the case may be, and will absorb such material. When the animal contacts the applicator by passing under, over, or against the same, the units or links 11 which contact the animal will tend to be compressed and squeeze a small amount of the said fluid onto the animal's hair and hide. Burlap, being somewhat of a coarse texture, affords a roughened surface against which the animal will scratch and thereby rub the fluid or powder onto the animal hair and hide. It will be quite apparent that the applicator or chain may be positioned at any of various locations on the premises, as for example, the chain may be strung up in the doorway of the animal barn whereby each animal entering or leaving will be treated with the medication, fluid, powder, oil, or insecticide contained in the chain.

It will also be apparent that while I have described my invention as applying to the general field of animal treatment, that the device has general utility for use wherever rope or other flexible material may be desired.

For instance, the device may be used for forming enclosures or barriers in general.

I claim:

1. An animal hide oiler comprising a length of chain, said chain composed of elongated links having substantially parallel side members, a pad of absorbent, coarse, woven materials disposed between the side members of each link, the side members having helical configuration intermediate their ends to lock said pad therein, said pad having a cylindrical, helical ribbed surface, said chain freely supported between two posts so that animals may pass thereunder compressing said pads to squeeze out liquid held therein.

2. An oiler as in claim 1 wherein said pad has a plurality of layers of woven material, said pad being formed from a single piece of square material having fold lines extending parallel to each edge and spaced therefrom one quarter of the distance to the opposite edge whereby said pad will be composed of four layers of woven material.

References Cited in the file of this patent
UNITED STATES PATENTS

| | | |
|---|---|---|
| 2,603,921 | Peterson | July 22, 1952 |
| 2,697,415 | Peterson | Dec. 21, 1954 |
| 2,742,661 | Carvalho | Apr. 24, 1956 |
| 2,777,421 | Hiebert | Jan. 21, 1957 |

OTHER REFERENCES

Successful Farming, July 1952 Magazine, page 64.